United States Patent [19]

Lighthall

[11] 3,903,511

[45] Sept. 2, 1975

[54] FAULT DETECTION FOR A RING CORE MEMORY

[75] Inventor: John T. Lighthall, Brockville, Canada

[73] Assignee: GTE Automatic Electric (Canada) Limited, Brockville, Canada

[22] Filed: Aug. 16, 1974

[21] Appl. No.: 498,158

[52] U.S. Cl. .......................... 340/174 TC; 324/34 R

[51] Int. Cl.$^2$ .......................................... G11C 11/02

[58] Field of Search .... 340/174 TC, 174 ED, 172.5; 324/34 R

[56] References Cited

UNITED STATES PATENTS

| | | | |
|---|---|---|---|
| 3,246,240 | 4/1966 | Arnold et al. | 340/174 TC |
| 3,474,421 | 10/1969 | Stein | 340/174 TC |
| 3,497,797 | 2/1970 | Meyers et al. | 324/34 |
| 3,655,959 | 4/1972 | Chernow et al. | 324/34 |

*Primary Examiner*—Vincent P. Canney
*Attorney, Agent, or Firm*—John T. Winburn

[57] ABSTRACT

Word wires are threaded through some cores of a module for bit "1" and around others for bit "0". A current ramp pulse from a selected memory driver through a word wire to a selected memory switch produces an output in sense windings on the cores with bit 1. The current ramp is produced with two generators, one on the driver side and one on the switch side. The drivers and switches are simple current gates with a pulse transformer and a transistor, which along with other current gates are selected from an address register to steer the current ramp. There are up to 8 modules with sense windings in multiple via a twisted pair to a differential sense amplifier. Each sense winding has a decoupling diode to the twisted pair, and a resistor across the winding to clear it down. There may be up to 3 or 4 units each having 8 modules, each unit having its own select circuits and sense amplifiers; with common timing circuits and common output receivers with a twisted pair balanced input multiple from the sense amplifiers, to supply the output to common latches. The system is duplicated except for the core modules, but each core has two sense windings.

Fault detection includes a circuit having a common resistor for supplying a bias voltage to all memory switches of a unit. Two comparators check the voltage across this resistor, the first to give an output if any switch is turned on, and the second to give an output if more than one switch is turned on. These outputs are sampled and interpreted by the central processor. Various checks may be made for shorts or opens in the memory switches, drivers, diodes, etc. by programming techniques and information in special word wires.

7 Claims, 12 Drawing Figures

FAULT DETECTION FOR A RING CORE MEMORY

BACKGROUND OF THE INVENTION

1. Field of the Invention

This invention relates to fault detection for a memory of the type having word wires threaded through some cores and around others; and more particularly to detection of faults such as short or open circuits for the memory drivers and switches, or diodes in the word wires.

2. Description of the Prior Art

A ring core memory arrangement is described in the SYSTEM S1 and S1 MEMORY U.S. Pat. Nos. 3,487,173 and 3,587,070 mentioned in the cross references below. In that arrangement each memory driver when selected is designed to produce a current ramp through a word wire having a memory switch selected.

There are known detection arrangements using a common resistor between a voltage source and a number of devices, with detectors to compare the voltage drop across the common resistor to reference values to determine the number of devices operated.

SUMMARY OF THE INVENTION

The object of this invention is to provide simple and effective fault detection for a ring core memory.

According to one feature of the invention, a common resistor is connected between a bias voltage source and a junction point common to all of the memory switches of a memory unit, there being in each memory switch a bias resistor connected from the junction point to the collector electrode of a transistor, and two fault detectors are connected to compare the voltage drop across the common resistor to reference values so that one of the detectors produces an output if at least one memory switch is turned on and the other detector produces an output if more than one switch is turned on. A fault register comprises three bistable devices (flip-flops or latches) to store the output of the detectors during every memory cycle, one connected to store the inverted output of the first detector at the beginning of the cycle before actuation of the memory switch, and two connected to respectively store the outputs of the two detectors near the end of the actuation interval for the switch.

Further according to the invention, there is a special address for which no memory driver is equipped, which is used to inhibit the normal memory output gating to a common bus, and instead if there is a read or "data in" control signal the outputs of the fault register are gated to the bus, and if there is a write or "data out" control signal with the special address the fault register is cleared.

According to another feature of the invention, fault detection includes a special word wire for each memory driver, each connected between its memory driver and the same memory switch, the special word wires being threaded for different contents for any two memory drivers, so that if a short occurs between two memory drivers, accessing the memory arrangement with the address for one of the special word wires will produce an incorrect output.

CROSS REFERENCES TO RELATED PATENTS

The invention makes use of a ring core memory of the type disclosed in U.S. Pat. No. 3,487,173 issued Dec. 30, 1969 by R. W. Duthie and R. M. Thomas for a Small Exchange Stored Program Switching System, hereinafter referred to as the SYSTEM S1 patent. The memory with some modifications is shown in U.S. Pat. No. 3,587,070 issued June 22, 1971 by R. M. Thomas for a Memory Arrangement Having Both Magnetic-Core and Switching Device Storage With a Common Address Register, hereinafter referred to as the S1 MEMORY patent.

The invention is incorporated in the system shown in U.S. Pat. No. 3,767,863 issued Oct. 23, 1973 by R. A. Borbas et al for a Communication Switching System With Modular Organization and Bus, hereinafter referred to as the SYSTEM S2 patent.

RELATED INVENTIONS DISCLOSED

The features disclosed herein relating to selection of memory drivers and memory switches, including generation and steering of the current ramp; and features relating to combining outputs from the memory cores and sense amplifiers, were designed jointly by John T. Lighthall and David M. Shaver, and claimed in copending application, Ser. No. 498,145, filed the same day as this application.

Features relating to the sense amplifier circuit itself were designed by D. M. Shaver and claimed in copending application, Ser. No. 498,157, filed the same day as this application.

SYSTEM WITH BUS AND MODULAR ORGANIZATION

Figure 1:
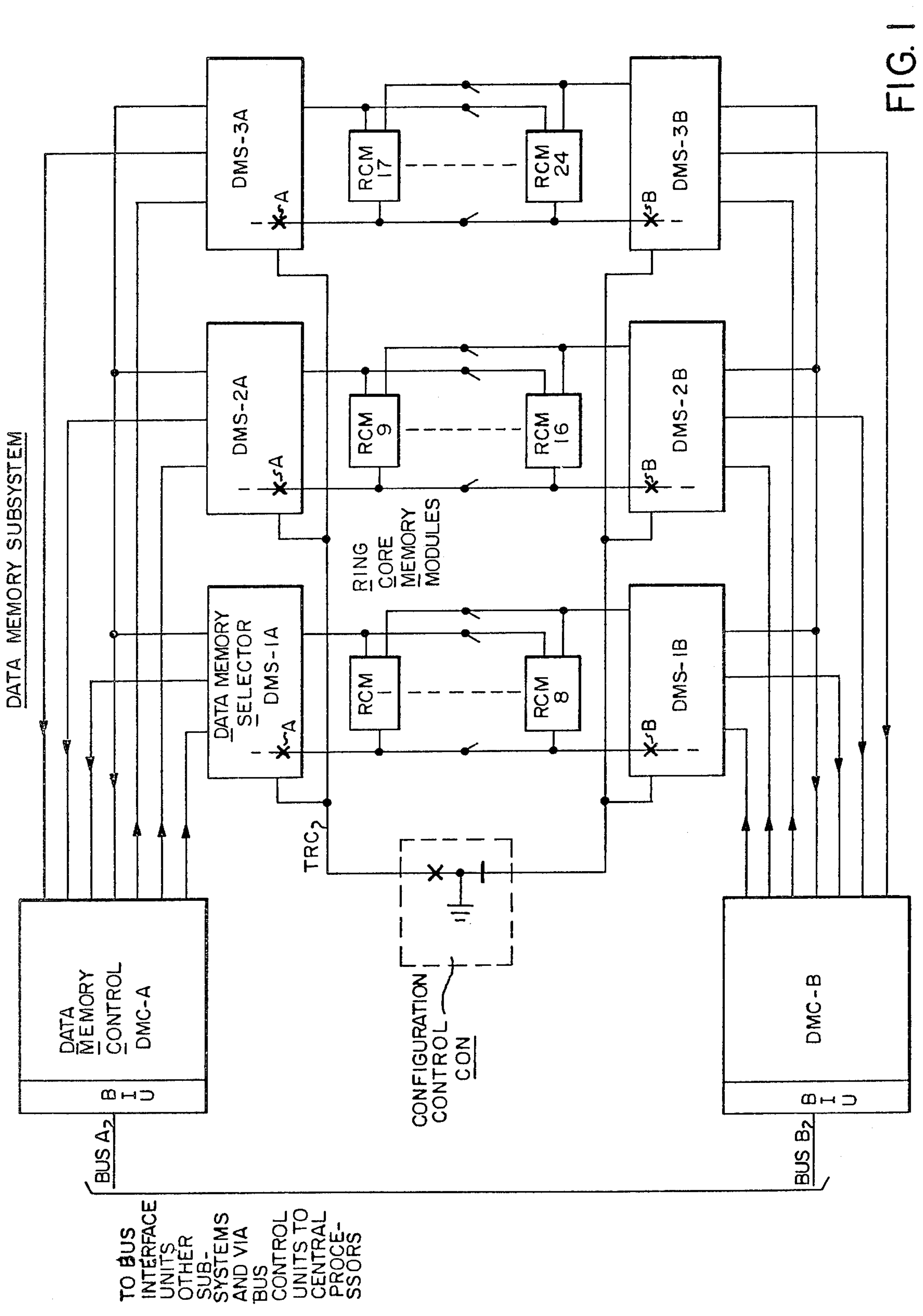
FIG. 1 is a block diagram of the data memory subsystem.

As described in said SYSTEM S2 patent, a duplicated central processor and several other subsystems are organized with a duplicated bus arrangement for interconnection among them. Each central processor has a bus control unit, coupling one central processor to bus A and the other to bus B. Each subsystem has at least part of its apparatus duplicated, and coupled to the two busses via its own bus interface unit, which has duplicate circuits for the two busses. Each bus comprises twenty bidirectional data conductors and six control conductors. The bus interface units BIU of all subsystems are identical except for strapping of an address unique to each subsystem.

Each of the subsystems appears to the central processors as a section of random access memory, with a number of word stores, each storing a maximum of twenty bits. A twenty bit address is used, with bits 1–4 as a page number identifying a subsystem type, and the other bits for selecting a word store within the subsystem type. Some subsystem types may comprise a plurality of modules, each having its own bus interface unit.

Each bus interface unit has a section for each bus, which comprises control circuits with flip-flops and gates, a set of twenty driver gates coupling the bus data conductors to subsystem data conductors SDAT1-SDAT20, and a set of twenty driver gates coupling the subsystem data conductors to the bus data conductors.

The bus control unit and the section of the bus interface unit for one bus go through an operation cycle each time the corresponding central processor requests access to a word store of a subsystem. The operation is explained in said SYSTEM S2 patent. A summary thereof as seen in the effect on the conductors coupling the bus interface unit to the subsystem follows.

The operation is divided into an address cycle followed by a data cycle. During the address cycle, an address from the central processor is gated via the bus control unit to the bus data conductors; and the bus control unit also supplies signals on bus control conductors. Each bus interface unit has strapping to decode either bits 1–4 or 1–8 of the address, so that only one is selected. The selected bus interface unit supplies a signal on lead $\overline{\text{SELCT}}$ to its subsystem, followed by all twenty bits of the address gated to leads $\overline{\text{SDAT1}}$-$\overline{\text{SDAT20}}$ and a clock signal to lead $\overline{\text{ADCL}}$. At the end of the address cycle the signals are removed from leads $\overline{\text{SDAT1}}$-$\overline{\text{SDAT20}}$ and $\overline{\text{ADCL}}$.

The data cycle may indicate either read data in from the subsystem to the central processor, or write data out to the subsystem. Since the data memory is a read only type, the operation is data in. The bus interface unit enables the driver gates to couple data from the conductors $\overline{\text{SDAT1}}$-$\overline{\text{SDAT20}}$ to the bus data conductors, and supplies a signal on lead $\overline{\text{WRST}}$ as a command to the subsystem to place data on these lines. The subsystem acknowledges response to the command by a signal on lead ACKC. This causes the signal on lead $\overline{\text{WRST}}$ to be removed and the driver gates in the bus interface dis-enabled. After 200 nanoseconds, the signal on lead $\overline{\text{SELCT}}$ is cleared to return to the idle condition.

There is one situation in which a data out cycle is used for the data memory subsystem, with a special address to reset the fault buffer. In this case a signal appears on lead $\overline{\text{RDST}}$ instead of $\overline{\text{WRST}}$.

DESCRIPTION OF THE PREFERRED EMBODIMENT DATA BASE MEMORY

The data base memory is one of the subsystems shown in the SYSTEM S2 patent, in a communication switching system. The data base memory contains information pertinent to subscriber lines, trunks and the organization of a particular office. The memory element is a large ring core made of linear ferrite material as shown in the SYSTEM S1 and S1 MEMORY patents. These cores are organized into modules of twenty cores each for storing twenty bits of a memory word. Each memory word comprises a wire which is threaded from a driver and thence through some cores for bit 1 and around other cores for bit zero and thence to a memory switch. Each of the memory modules comprises up to 700 of these word wires.

The maximum data base requirements comprise 9100 words or 15 modules for directory number to equipment number translations, 4800 words or seven modules for class of service, and 2100 words of three modules for tables.

A memory address consists of sixteen bits or four hexadecimal digits, assigned in bits 5 through 20 of a system address. The numbering system has possible values for each hexadecimal digit of 0–9, θ, B, C, D, E and F. For the data base memory the thousands digit in bits 5–8 has an allowable range of 0–F and the hundreds digit in bits 9–12 has an allowable range of 0–D, these two digits being used for driver selection. The tens digits in bits 13–16 has a range of 1–θ and the units digit in bits 17–20 has a range of 1–θ, these two digits being used for switch selection.

No directory number strapping is provided. A legitimate dialed number or line equipment number will always contain two digits in the range 1–θ, such that the last two digits always form a valid switch address. However, the driver addresses equipped will not, in general, fall into the correct range. Thus a pre-translation or normalizing operation must be performed on the first two digits to determine the associated driver number. As an example, the translation for directory number 2θ58 might be in memory location 6F58. Note that the last two digits (switch address) have not changed.

MEMORY HARDWARE ORGANIZATION

Referring to FIG. 1, the data base memory is divided into three principal blocks, data memory control (DMC), data memory selector (DMS), and ring core memory (RCM). The data memory control and data memory selector are completely duplicated. Thus the data memory control comprises units DMC-A and DMC-B for the A and B systems respectively. Each data memory control has associated therewith a bus interface unit BIU for coupling the subsystem to the system bus. As shown in the SYSTEM S2 patent, the A system includes a central processor and bus control unit coupled to bus A, and the B system comprises another central processor which is a duplicate of the first along with a bus control unit coupled to bus B. The data memory selector comprises up to three units in each of the A and B systems, with the A system units shown in FIG. 1 as DMS-1A, DMS-2A, and DMS-3A, with corresponding units for the B system. The first data memory selector DMS-1A along with its mate DMS-1B have access up to eight core modules RMC1-RCM8, the units DMS-2A and 2B have access to core modules RCM9-16, and the units DMS-3A and 3B have access to core modules RCM17-24. The connections from the drivers and switches in the data memory selectors to the word wires in the core modules are connected either only from the A system or only from the B system using relays shown symbolically as A for system A and B for system B in the data memory selector blocks. A configuration control unit CON supplies a signal TRC to the A system to operate its relays, or alternatively a corresponding signal to the B system for its relays. Each of the ring cores has two sense windings, one for the A system and the other for the B system, those for each system associated with the same data memory selector unit being connected in multiple.

DATA MEMORY CONTROL (DMC)

The data memory control contains the control, timing, and decoding functions required to operate the drivers and switches in, and detect the sense amplifier outputs from three data memory selector units.

The data memory control responds to address and control signals from its bus interface unit. See FIG. 10 for data memory control timing. The timing is controlled by a 4-megahertz oscillator 202 which supplies a square wave at 125 nanoseconds ON and 125 nanoseconds OFF to lead SCL and $\overline{SCL}$. The oscillator is started when a flip-flop 201 is set by a clock signal on lead $\overline{ADCL}$, the output of the flip-flop being supplied via an AND gate 211 to start the oscillator 202, and at the same time to start a monostable device 204. The oscillator is stopped by the output of a sequence counter 203 causing a flip-flop 205 to be set, whose output inhibits gate 211. The sequence counter 203 is stepped via signals on lead $\overline{SCL}$ to generate the timing sequences used by the memory. Access time is 3.5 microseconds, and cycle time is 10 microseconds. The monostable 204 provides the 10-microsecond interval. This interval prevents the memory from cycling any faster than the 10-microsecond rate to avoid component damage, incorrect readout, and invalid fault indicators.

Figure 4:
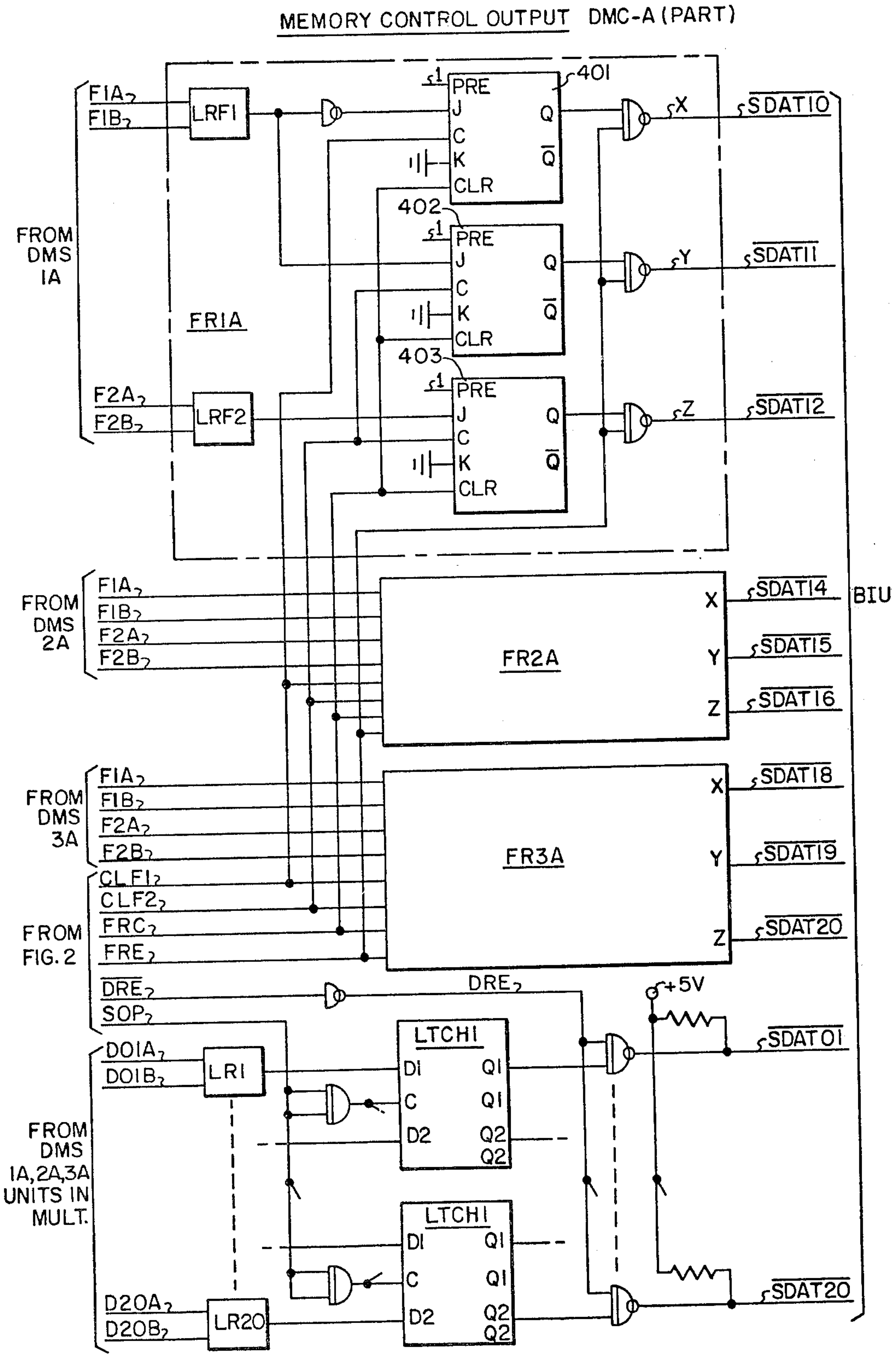

The data memory control also contains a fault register shown on FIG. 4 which stores samples of the data memory selector fault detector outputs.

Figure 2:
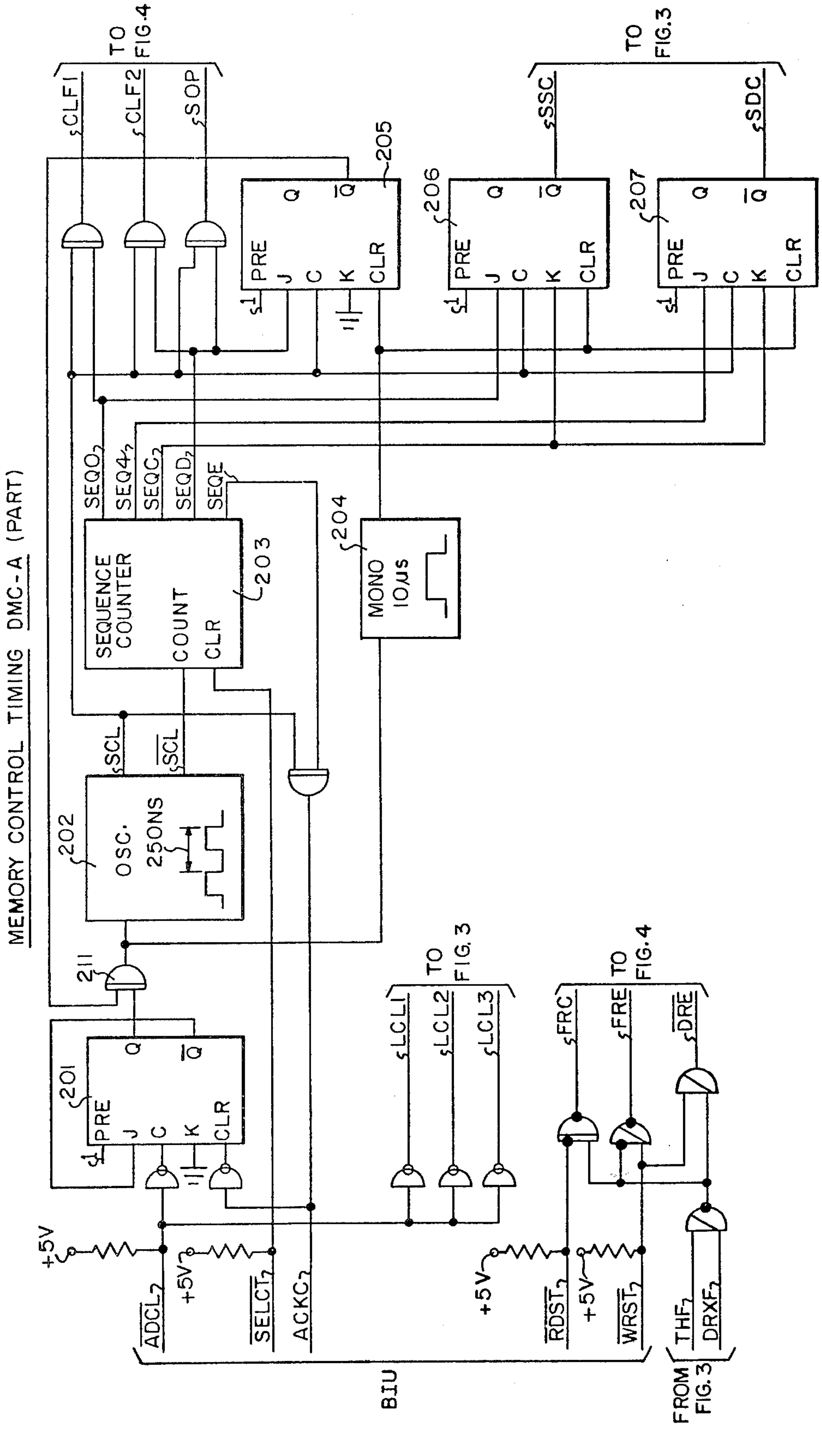
FIGS. 2, 3 and 4 comprise a functional block diagram of the data memory control circuits of the subsystem shown in FIG. 1.
Figure 3:
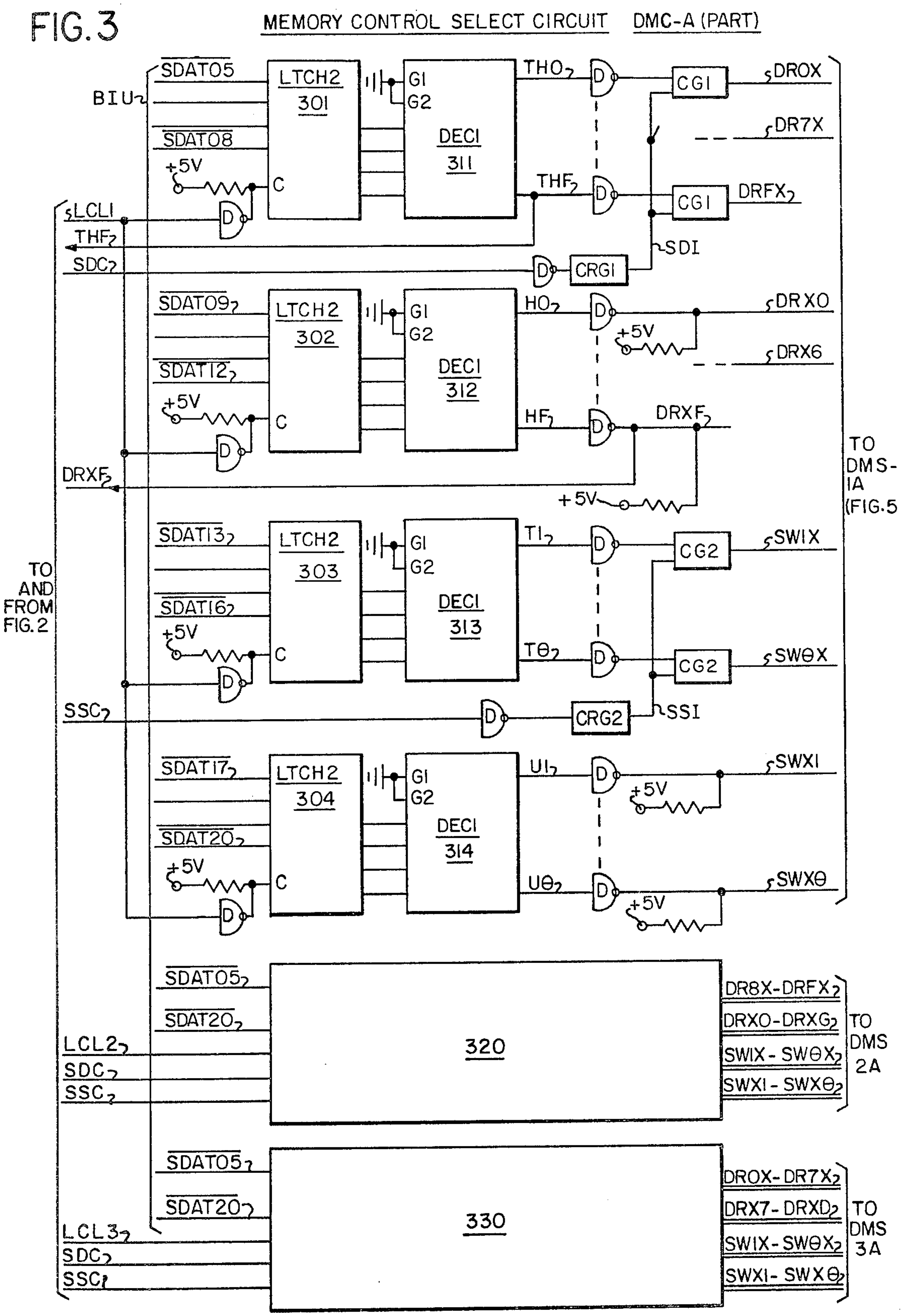

As shown in FIG. 3 the data memory control includes latches, decoders and gates for storing the address digits and supplying signals to select the drivers and switches. There are three sets of these circuits for the three data memory selectors respectively. The first comprises latches 301 for the thousands digit, 302 for the hundreds digit, 303 for the tens digit, and 304 for the units digit. These digits are supplied during an address cycle from the bus interface unit BIU on leads $\overline{SDATO5}$ through $\overline{SBAT20}$, and are gated in when a clock signal from lead $\overline{ADCL}$ (FIG. 2) is supplied via an inverter, lead LCL1, and driver inverters to the latches. The thousands digit decoded by decoder 311 has outputs THO-THF, the hundreds digit from decoder 312 has outputs HO-HF, the tens digit from decoder 313 has outputs T1-T$\theta$, and the units digit from decoder 314 has outputs U1-U$\theta$. The outputs are supplied via current gates through leads for selection of the drivers in the data memory selector DMS-1A FIG. 5. There are identical circuits 320 supplied to the unit DMS-2A and another set 330 supplied to the unit DMS-3A. The latches in block 320 are set from the 16 data leads from the bus interface unit via a clock pulse on lead LCL2, and those in block 330 are set from the same data leads in response to a clock signal on LCL3. All of these clock signals are derived from lead $\overline{ADCL}$ as shown in FIG. 2.

The data memory control also includes line receivers and latches as shown at the bottom of FIG. 4, for receiving the outputs of the sense amplifiers.

DATA MEMORY SELECTOR (DMS)

Figure 5:
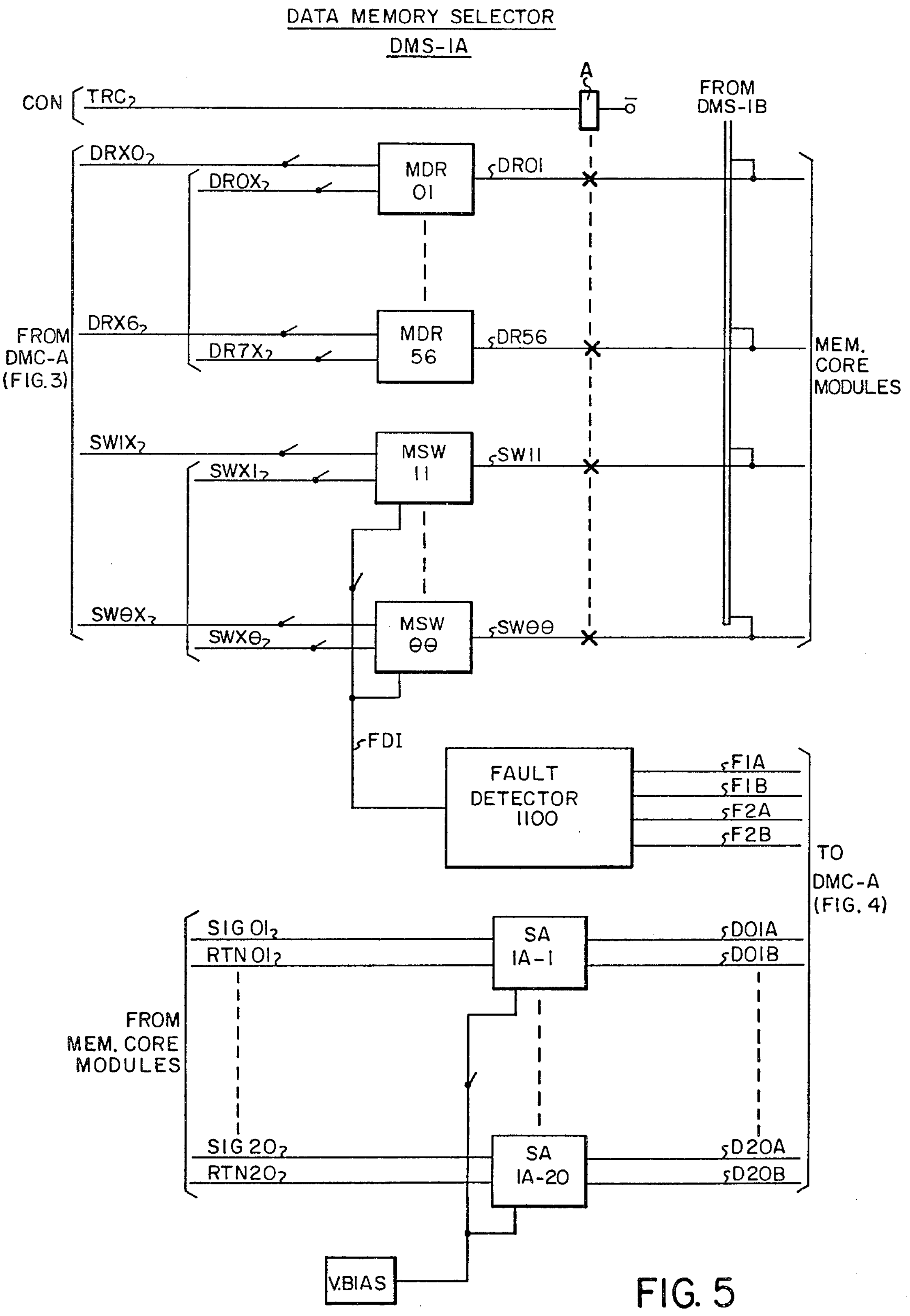
FIG. 5 is a block diagram of the data memory selector of the subsystem of FIG. 1.

Each of the data memory selector units, such as unit DMS-1A shown in FIG. 5, contains a maximum of 56 memory drivers MDR01-MDR56, 100 memory switches MSW11-MSW00, transfer relays, fault detector 1100, twenty sense amplifiers SA1A-1 through SA1A-20, and zero or twenty terminator circuits for the sense amplifier outputs.

Memory drivers and switches are selected on a X-Y matrix basis to minimize cabling (e.g. 15 wires are used to select 1/56 memory drivers in an 8×7 array). The memo ry drivers and memory switch circuits are AC coupled to the data memory control and selected by a combination of a current pulse and a logic level. Relay contacts connect the output leads from the drivers and switches to the word wires in the core modules. Although shown as a single relay A operated by the signal on lead TRC from the configuration control CON, there are in fact twelve slave relays for the driver output contacts, and twenty slave relays for the switch output contacts.

Figure 9:
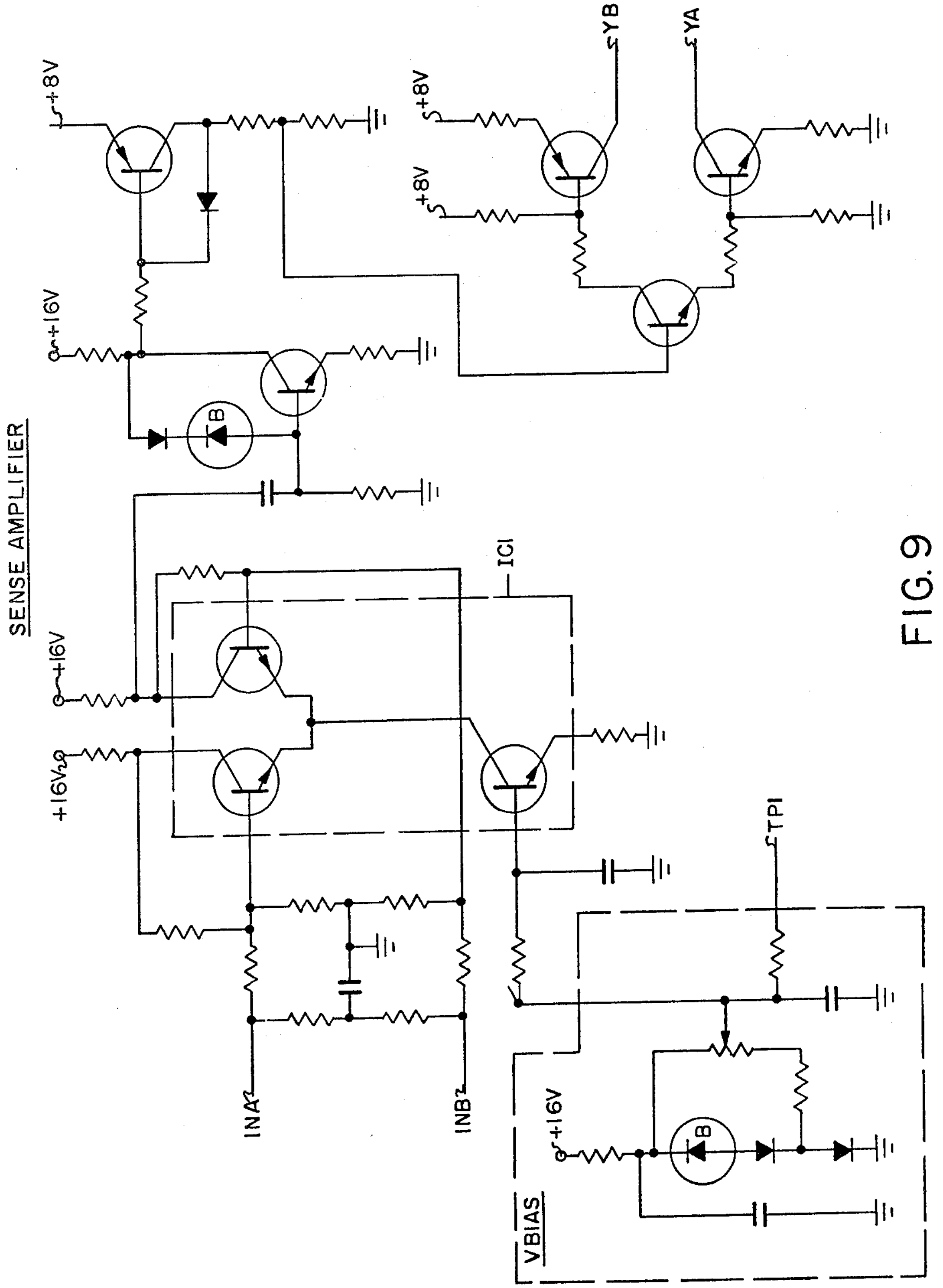
FIG. 9 is a schematic diagram of a sense amplifier.

The sense amplifier is a differential amplifier as shown in FIG. 9 with a double-end output suitable for "wire-or" or "party-line" operation. The sense amplifier outputs are on a common bus running from the data memory control to all equipped data memory selector units. This bus is terminated at the data memory selector electrically furthest from the data memory control. Sense amplifiers are equipped twenty per card.

A dual power supply provides +8 volts for the memory driver, sense amplifier, and fault detector circuits, and +16 volts for sense amplifier and fault detector circuits. The memory switches are set by a modified +16 volts from the fault detector circuits.

RING CORE MEMORY

Figure 6:
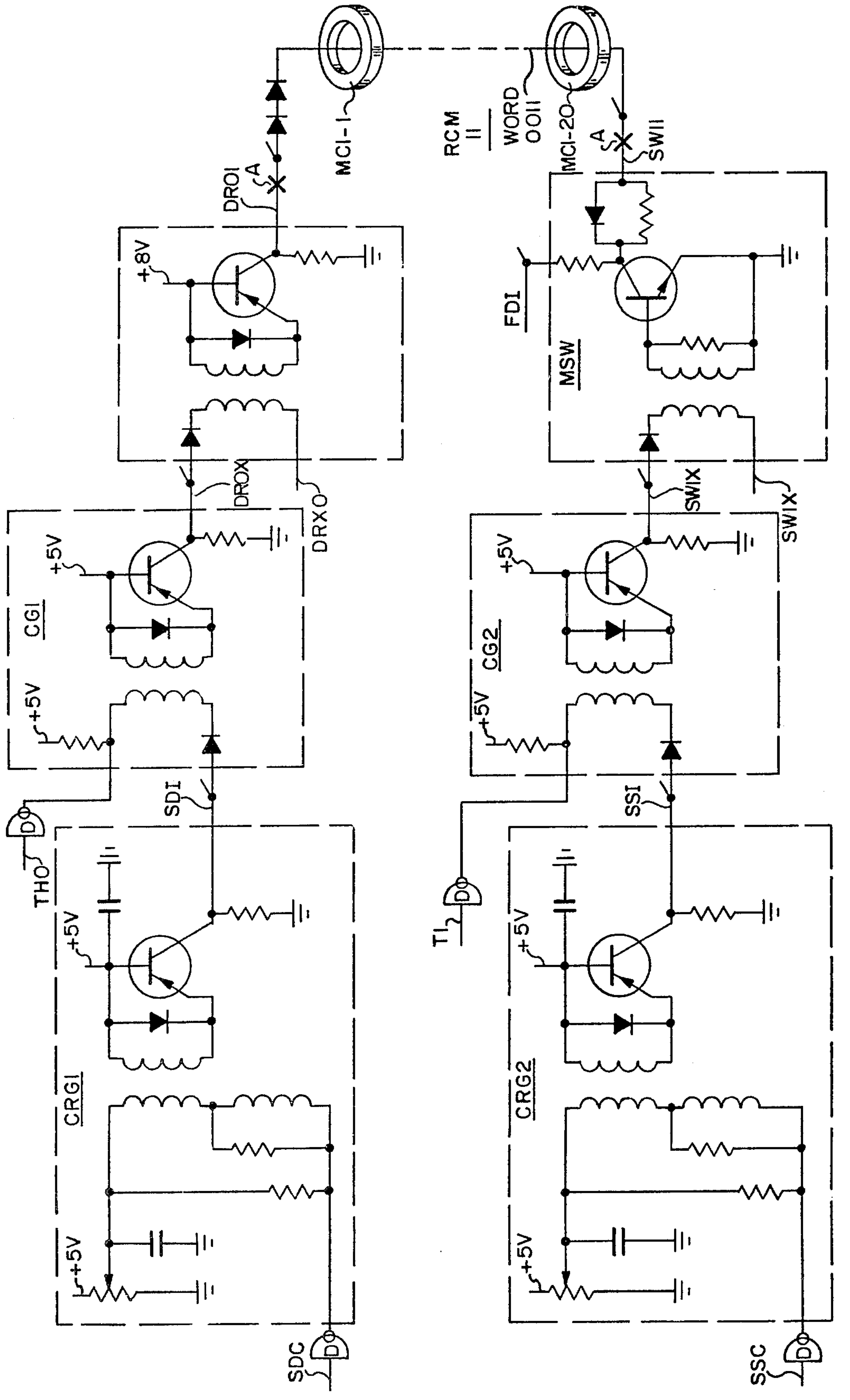
FIG. 6 is a schematic diagram of some of the circuits of FIGS. 3 and 5 along with one word of a memory module.

One memory module RCM11 is shown in FIG. 6 comprising twenty ring cores MC1-1 through MC1-20. One word wire 0011 of the 700 is shown. To achieve low failure rates due to shorted or degraded diodes, two diodes in series are used, with a common anode connection to other word wires.

Figure 7:
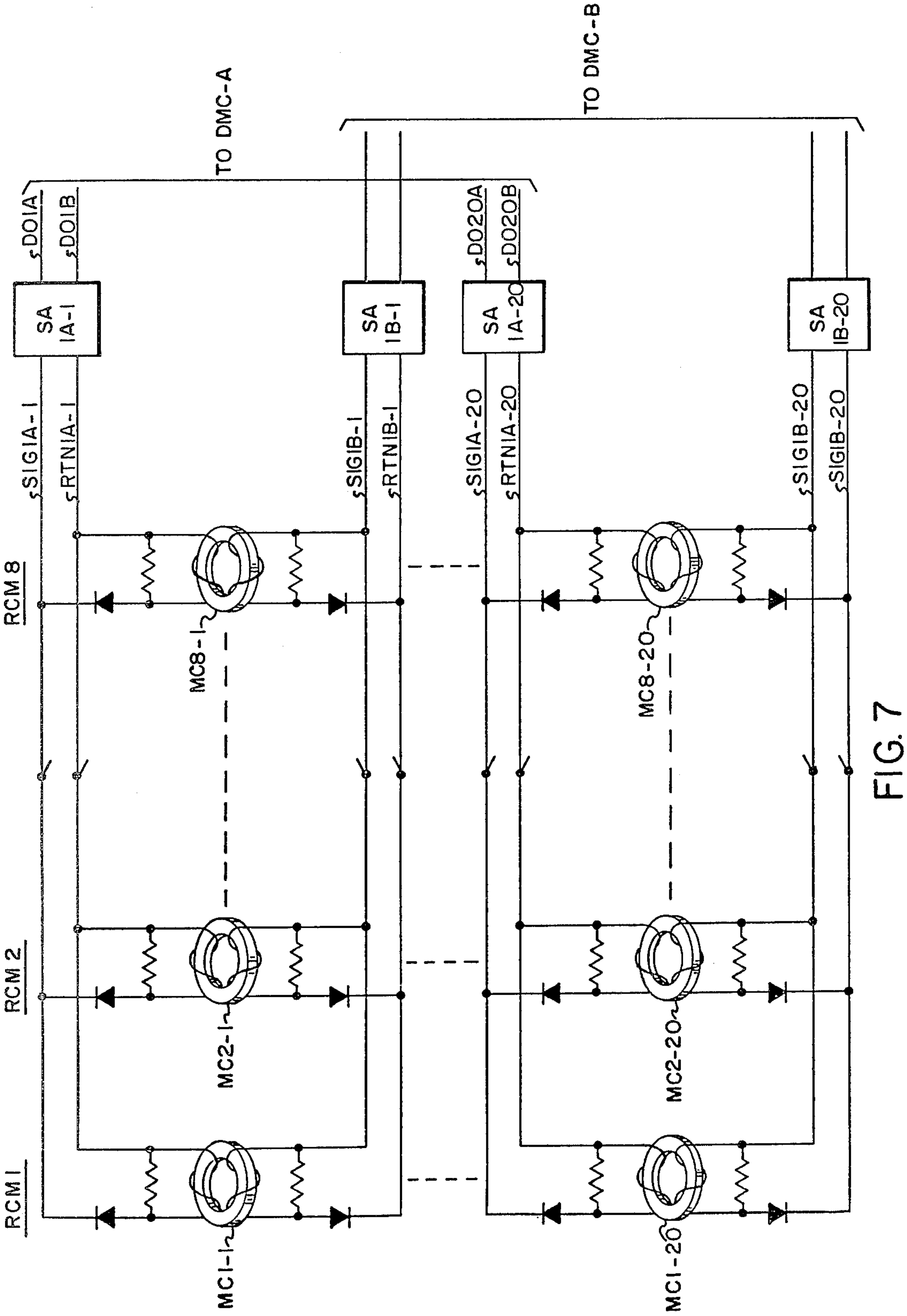
FIG. 7 is a diagram showing how the sense windings of the memory are coupled to sense amplifiers.

As shown in FIG. 7, memory core outputs pass through a diode/resistor circuit mounted on the module. This allows the core outputs from eight modules to be OR'ed on the memory frame instead of in the sense amplifier.

OPERATION FOR SELECTION OF A MEMORY WORD

After the oscillator 202 of FIG. 2 is started the sequence counter 203 steps through 15 steps SEQO through SEQE. The output on lead SEQO is supplied to the J input of flip-flop 206, so that it sets on the trailing edge of the next clock pulse on lead SCL. The output $\overline{Q}$ of this flip-flop via lead SSC is supplied in FIG. 3 via a driver inverter to a current ramp generator CRG2 for the switch circuits. Similarly the output from lead SEQ4 is supplied to the J input of flip-flop 207 which is then set on the trailing edge of the next clock pulse, to supply an output from its $\overline{Q}$ output via lead SDC via a driver inverter to a current ramp generator CRG1 for the driver circuits. The current ramp from the generator CRG2 supplied via lead SSI to ten current gates designated CG2 one of which is selected at a logic input from one of the tens decoder leads to supply a signal on one of the ten leads SW1X through SW$\theta$X to one of the memory switches in FIG. 5. This signal in coincidence with the signal on one of the leads SWX-1-SWX$\theta$ of the units digit selects one of the one hundred switch circuits. The current ramp from generator CRG1 via lead SDI is supplied to the current gates designated CG1 one of which is selected by an output from the thousands digit decoder to supply a signal on one of the eight leads DROX through DR7X to a memory driver in FIG. 5, and this in coincidence with one of the hundreds digit signals on one of the seven leads DRXO through DRX6 selects one of these 56 memory drivers. When the sequence counter reaches the step with an output on lead SEQC, the K inputs of flip-flops 206 and 207 are enabled so that on the next clock pulse they are reset as shown in the timing diagram of FIG. 10 to cut off the memory driver and memory switch current ramps. At the step with an output on lead SEQD the J input of flip-flop 205 is enabled so that it sets at the trailing edge of the next clock pulse on lead SCL to inhibit gate 211. The oscillator continues for an additional step to reach the output on lead SEQE which in conjunction with the clock pulse on lead SCL via an AND gate supplies the signal to lead ACKC as an acknowledgement signal to the bus interface unit BIU. This signal also clears the flip-flop 201. When the monostable 204 reaches the end of the ten-microsecond interval it clears flip-flops 205, 206 and 207.

ELECTRONIC COMPONENTS

The SYSTEM S2 patent at column 18 and 19 includes description of the electronic components using integrated circuits of the 7400 series. The JK flip-flops may be type 7476. The monostable 204 is a type 74123. The oscillator 202 comprises two monostables type 74121 with timing resistors and capacitors. The sequence counter 203 comprises a counter type 74193 and a decoder type 74154. The latches 301-304 comprise type 74100 and the decoders are type 74154. The inverters designated with a D in FIG. 3 each comprise two or three type 7407 buffers on the same chip in parallel.

The line receivers LR1-LR20 as well as LRF1 and LRF2 are industry type 8820 or equivalent. The latches type LTCH1 shown on the bottom of FIG. 4 are type

Figure 11:
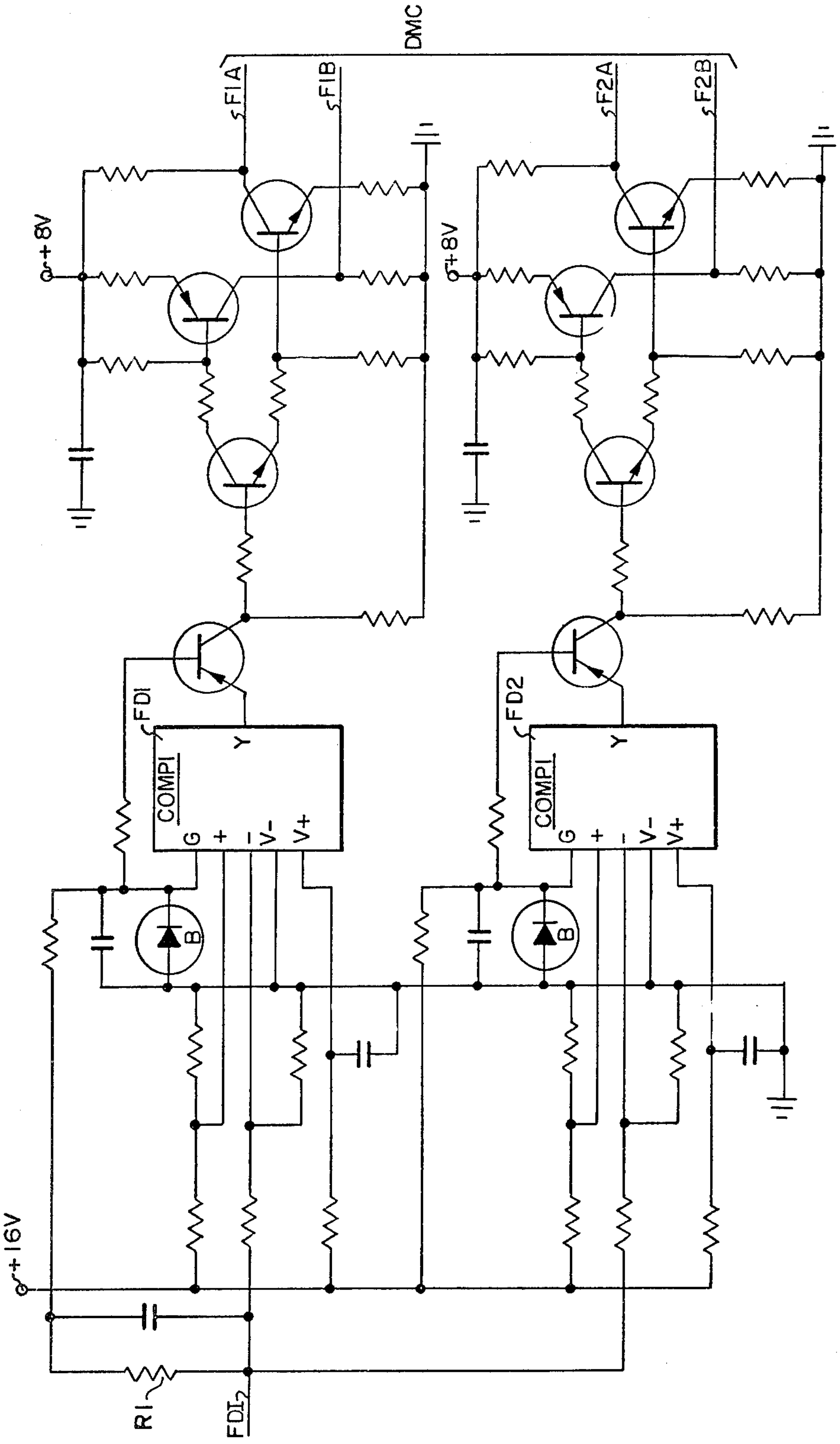
FIG. 11 is a schematic and block diagram of the fault detector used in the data memory selector of FIG. 5.

7475. The differential amplifiers COMP1 shown in FIG. 11 are industry type 3054 or equivalent.

Circuits for the current ramp generators CRG1 and CRG2, and the current gates CG1 and CG2 of FIG. 3 are shown schematically in FIG. 6 along with schematics of a memory driver MDR and a memory switch MSW. These circuits make use of discrete transistors.

HARDWARE FAULT DETECTION

Hardware fault detection in the data base memory is primarily aimed at detecting incorrect operation of the memory switch circuits, shorts on the memory module terminal blocks, shorted diodes, and cabling faults. It will also detect some classes of gate failure in the data memory control DMC which will cause incorrect switch operation.

PRINCIPLE OF HARDWARE FAULT DETECTION

Detection is accomplished with the fault detector 1100 (FIGS. 5 and 11) by monitoring the memory switch current drawn from the +16 supply, using two high speed ($\sim 1 \mu s$) sensing circuits FD1 and FD2 which trip at specific current levels.

Between memory cycles, the fault detector circuits are normally in the OFF condition. When a switch is operated, FD1 is tripped. If excessive currents flow at this time, both FD1 and FD2 will trip.

The fault detector outputs are samples at two points in the memory cycle to determine the following faults:

TABLE 1

| TIME | DETECTOR | STATE | CAUSE |
|---|---|---|---|
| a) START OF CYCLE (SEQ. STATE O) | 1. FD1 | TRIPPED | 1. SWITCH STUCK AT GRD.<br>2. WIRING SHORT TO GRD. IN DMS OR MEM FRAME |
| | 2. FD1 | OFF | 1. NO FAULT |
| b) END OF CYCLE (SEQ. STATE E) | 1. FD1 | OFF | 1. OPEN SWITCH CIRCUIT<br>2. OPEN IN DMC-DMS WIRING<br>3. LOGIC FAILURE IN DMC SWITCH SELECT CIRCUITS |
| | 2. FD1 | TRIPPED | 1. NO FAULT |
| c) END OF CYCLE (SEQ. STATE E) | 1. FD2 | TRIPPED | 1. MORE THAN 1 SWITCH TURNED ON.<br>2. ONE SWITCH STUCK LOW AND ANOTHER TURNED ON.<br>3. MULTIPLE STUCK LOW SWITCHES<br>4. WIRING SHORTS. TERM BLOCK OR CONNECTOR SHORTS.<br>5. SHORTED MEMORY DIODE*<br>6. SHORTED SWITCH CIRCUIT INPUT DIODE.<br>7. LOGIC FAILURE IN DMC SWITCH SELECT CIRCUITS |
| | 2. FD2 | OFF | 1. NO FAULT |

*It is possible to determine a set of worst-case component and power supply values such that a shorted diode would not be detected. Thus no absolute guarantee of detection can be given.

The sampled fault detector outputs are used to set flip-flops 401, 402 and 403 in the Fault Register (FIG. 4) of the data memory control DMC. Each of the three possible data memory selector DMS units has three associated flip-flops, which are located in memory address FFXX where XX is a valid memory switch address. Fault register FR1A is for the data memory selector DMS1A, FR2A for DMS-2A, and FR3A for DMS-3A. Bit assignment for the output may be designated as X, Y, Z assigned in DMS-1 to bits 10, 11, 12; in DMS-2 to bits 14, 15, 16; and in DMS-3 to bits 18, 19, 20 as shown in FIG. 4.

X = FD1 TRIPPED AT SEQ O (TABLE 1(*a*))

Y = FD1 NOT TRIPPED AT SEQ E (TABLE 1(*b*))

Z = FD2 TRIPPED AT SEQ E (TABLE 1 (*c*))

It should be noted that any unequipped data memory selector DMS will fail test 1 (*b*) - switch failed to operate, and the associated Y bit will be set. Otherwise, the error-free condition for all bits is 0.

The fault register is completely reset by a "Data Out" bus cycle to the data memory.

FAULT REGISTER DIAGNOSTIC FEATURES

When the Fault Register (FR) is accessed, the data memory performs a complete memory cycle and returns the fault register FR contents to the BIU. The switch address is unspecified, and can therefore be varied for testing purposes as follows:

*a*. A readout of FFYY where YY is not a valid switch address should cause bit 11, 15, and 20 to be set. This will provide a check of the fault detector response to an open switch condition.

*b*. To search for an open switch:

Use address FFXX, varying XX from 11 to 00. When the open switch address is reached, bit 11, 15 or 20 will be set. Note that all three DMS units are checked separately, so that the fault is isolated to one card and/or associated wiring and DMC logic.

*c*. To search for a switch stuck low:

Use address FFXX, varying XX from 11 to 00. The FR must be reset between tests. The X and Z bits of the defective DMS will set on all tests but one, indicating a stuck switch and more than one switch operated. On one test only the X bit will set, the current switch address will indicate the stuck switch.

*d*. To search for memory module terminal block shorts or switch wiring shorts:

This gives the indication of more than one switch operated, so bit Z of the faulty unit will be set. The indication will only appear when one of the affected switches is operated. Thus a search procedure as described in (*b*) can be used to pick out the affected switches, with bits 12, 16 and 20 used as indicators.

*e*. To search for a shorted diode:

Use FFXX, vary XX from 11 to 00, checking bits 12, 16, 20 (Z bits). For the affected unit, the Z bit will set for all switch addresses except the one related to the shorted diode. Reset the FR between tests. This should narrow the diode location down to one diode card per equipped driver. However, because of the finite possibility of non-detection of a shorted diode, it is recommended that all switch addresses be tried to make sure the correct location is found. This method assumes that each driver is fully equipped with 100 word-wires for testing to be effective, and as such will not be too useful except as a technique for distinguishing between shorted diodes and wire shorts (d). A shorted switch input diode can cause the same fault detector reaction as a shorted memory diode.

SOFTWARE FAULT DETECTION

The memory will react predictably to the following tests:

*a*. Two memory words, one all F's and one all 0's, can be used to verify sense amplifier operation. These words would be repeated in each 5600-word memory section.

*b*. A check of driver operation can be made by requiring each equipped driver to be provided with at least one non-zero address.

*c*. A short between two driver outputs can be detected in the following manner:

Equip a word in each driver with non-zero contents, using the same switch address for both. Make the contents of the two words recognizably different. If the two drivers are shorted together, one or both of the words will read out incorrectly. This method consumes (N-1). N words of memory space if all shorts of this type are to be detected, where N is the number of drivers to be cross-checked.

FEATURES OF THE DATA BASE MEMORY SUBSYSTEM

This document describes a memory system using the large ring-core principle employed in SYSTEM S1, while employing certain novel features in the accessing and read-out circuitry.

The memory information is contained in 700-word by 20-bit Memory Modules, similar to those used in the translation section of the SYSTEM S1 memory. Operation of the cores is essentially the same; a current ramp is passed through the selected word-wire, and where the word-wire passes through a core, an output is produced by the core to indicate a logic 1 condition.

The memory system is currently designed to access up to 24 Memory Modules, giving a total of 16,800 available addresses maximum.

The design is such that an additional 5600 words of memory could be implemented with minimal hardware changes.

The Memory System Block Diagram is shown in FIG. 1. The memory system described is the SYSTEm S1 and S1 MEMORY patents included:

*a* Arrangement and operation of memory cores

*b* Use of current ramp to drive cores

*c* Memory driver/switch and diode arrangement

*d* Sense amplifier arrangement

Differences between the memory system disclosed herein and the SYSTEM S1 memory system:

1. Generation of the ramp current:

In S1, each driver circuit was able to produce a current ramp, and did so upon being selected and clocked.

In this memory, a single current generator is used to generate the ramp used by all the drivers in a given data memory selector unit. The current is steered by the driver selection circuits (Current gates, logic gates) to the appropriate driver.

A current gate is defined as follows: It has two inputs and one output. The input conditions required to produce an output are a logic 0 (ground) on one input and a current supplied to the other input. When these two conditions are met, the current gate makes available at its output a current *k*I, where I is the current applied to one input and *k* is a constant. In this arrangement *k* is chosen as 2, thus the initial current ramp need only be generated at one-half its final value. For driver selection, the ramp is generated as 2$\mu$s long, rising from 0 to 50 mA. See CG1 in FIG. 6.

The current input is connected in multiple to all the other driver current gates. The logic input comes from the 1/16 decoder, and only one logic input is at ground at any time. The remaining logic inputs are held at +V (in this case 5 volts). Thus diode CR1 can conduct in only one current gate, the other CR1's being reverse biased. T1 passes this current to the emitter of the transistor. Because a 2:1 transformer is used, the current is doubled in the process. A current gate is selected by a 1/16 decode of the first four memory address bits.

2. Driver Circuit:

The memory driver MDR is now a very simple circuit, being essentially a current gate with $k$=1. This is considerable advantage for the following reasons:

a. A large number of these are used in the system - 168 (336 counting duplication) in a full-sized system.

*b*. The small physical size of the circuit (5 components) and the X-Y selection capability allow a large number of circuits to be placed on one circuit board. In this system 28 drivers in a 4×7 array are placed on one card. It is possible to put all 56 drivers for one DMS unit on a card--the choice of 28 was made to keep the cost of partially equipped systems lower.

The choice of $k$=1 for the driver circuit is for reasons of noise immunity. Because the wires between the memory driver and its selection circuits can be up to about 15 feet long, the use of a 1:1 transformer in the driver circuit gives about 2 volts of noise immunity when the selection circuits are operating from +5 volts. (By comparison the current gate with $k$=2 has about 1 volt of noise immunity, but is located within a few inches of the circuits driving its inputs).

The logic input of the driver is driven by a highcurrent logic gate, selected by a 1/16 decode of the second four address bits. See circuit MDR in FIG. 6.

Note that there is no DC connection required between the data memory control DMC (location of the selection circuits) and the data memory selector DMS (location of the driver circuits).

The choice of +V is based primarily on the impedances and voltage drops (memory diodes, switch circuits, memory core back EMF) into which the driver must drive its output current. In this case +8 volts was chosen.

3. Selection of Switch Circuits:

The arrangement for selecting a switch circuit is similar to that for selecting drivers, and for similar reasons:

*a*. Reduction of number of leads from DMC to DMS - 20 wires will select from a 10×10 array or 100 switches.

*b*. A simplified switch circuit - 50 circuits per card.

*c*. DC isolation of the DMC and DMS.

In this case, a 1/10 decode of the third four bits of address selects a current gate, which then passes and doubles the current ramp supplied to it. A 1/10 decode of the last four bits selects a high current logic gate which puts out a logic 0 or ground condition.

The ramp current used differs from that used for the drivers, as shown adjacent lead SSI in FIG. 6. It comprises an initial step of 4 milliamperes, followed by a ramp to 20 milliamperes in 4 microseconds.

After passing through a current gate the current levels are doubled to 8 and 40 milliamperes respectively.

The initial step in the ramp is used to provide fast access of the switch circuit. Turn-on current is immediately available to the switch, which is necessary for the following reasons:

*a*. The switch output is loaded with a substantial amount of capacitance due to cabling. At the start of a memory cycle this capacitance is charged to some positive potential (+16 volts in this case), and must be discharged to ground when the switch turns on.

*b*. To reduce memory access time the capacitance must be discharged quickly, as the switch output must be close to ground before the memory driver current begins. Thus the step provides more initial turn-on drive for the switch than would a ramp such as that used for the drivers.

The step is simple to generate using standard pulse shaping techniques.

The switch current ramp starts one microsecond before the driver current ramp to allow this discharge of capacitance to take place.

The ramp is allowed to build up to 40mA in order to heavily saturate the switch transistor during the memory driver cycle.

4. Switch Circuit

See circuit MSW in FIG. 6.

5. Fault Detection

No fault detection specific to the memory was provided in SYSTEM S1. Field experience has shown that the most common faults in this type of memory are as follows:

*a*. Shorted or open switch circuits due to application of foreign potentials.

*b*. Switches shorted together by wire clippings.

Figure 12:
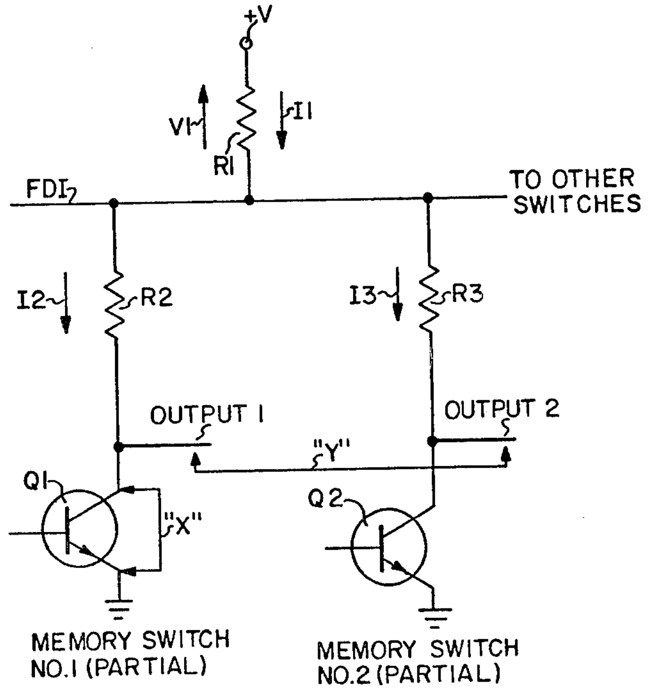
FIG. 12 is a schematic diagram for illustrating the operation of the fault detector.

A method has been devised to detect these conditions, and is detailed in FIG. 12 and Table A. The resistor R1 in FIG. 12, also shown in FIG. 11 as R1, is common to switch circuits as shown in FIG. 5 at lead FDI. Switch No. 1 and switch No. 2 of FIG. 12 can be any two of the 100 memory switches MSW11-MSW00.

TABLE A

| SITUATION | CAUSES | $I_1$ | $I_2$ | $I_3$ | TIME AT WHICH IT IS SAMPLED |
|---|---|---|---|---|---|
| No Switch Operated | 1. Normal case between memory accesses | ≈0 | ≈0 | ≈0 | |
| | 2. $Q1$ or $Q2$ open circuit or removed from equipment | " | " | | During switch selection cycle Require $I_1$>MIN $\left(\frac{V}{R1+R2}\right)$ |
| | 3. Fault in switch selection | " | " | | |

TABLE A-continued

| SITUATION | CAUSES | $I_1$ | $I_2$ | $I_3$ | TIME AT WHICH IT IS SAMPLED |
|---|---|---|---|---|---|
| | circuits | | | | |
| Switch No. 1 Operated | 1. Normal case during a memory cycle | $\approx \frac{V}{R1+R2}$ | $\approx I_1$ | $\approx 0$ | |
| | 2. Shortened $Q1$ | " | " | | At start of memory cycle (Before a switch is selected) Require $I_1 < \mathrm{MIN}\left(\frac{V}{R1+R2}\right)$ |
| | 3. Wire clipping (shown as) strap "X") | " | " | | |
| Both Switches Operated | 1. One switch shorted and another selected | $\approx \frac{V}{R1+\frac{R2}{2}}$ | $\approx \frac{I_1}{2}$ | $\approx \frac{I_1}{2}$ | During switch selection cycle Require $I_1 < \mathrm{MIN}\left(\frac{V}{R1+\frac{R2}{2}}\right)$ |
| | 2. Wire clipping (shown as strap "Y") | " | | " | |
| | 3. Fault in switch selection circuits | | | | |

The follwing notes apply to Table A.

1. The formulae shown are not exact, having been simplified for ease of explanation. The exact calculations include the effects of transistor voltage drops and the ringing suppression networks used in the switch outputs.

2. In practice this arrangement will detect some shorted memory diodes as well but cannot at this time be guaranteed to detect all cases of shorted diodes.

3. $I_1$ is measured by measuring $VI = I_1 \cdot R1$ using two integrated circuit voltage comparators. One comparator produces an output if $$I_1 > \mathrm{MIN}\left(\frac{V}{R1+R2}\right),$$

the other produces an output if $$I_1 > \mathrm{MIN}\left(\frac{V}{R1+R2/2}\right).$$

Figure 10:
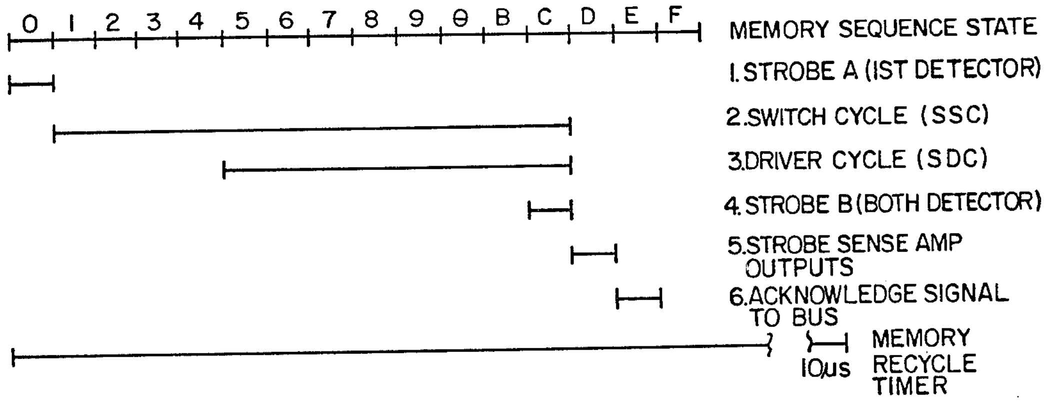
FIG. 10 is a timing chart of the data memory control.

The outputs of the fault detectors 1101 and 1102 of FIG. 11 are sampled at two points in the memory cycle, as shown in the memory timing diagram of FIG. 10, strobe A and strobe B.

The first detector 1101 is set to give an output if a switch is turned on. The second detector 1102 is set to give an output if more than one switch is turned on. Normal conditions are shown below:

| SAMPLE TIME | 1ST DETECTOR | 2ND DETECTOR |
|---|---|---|
| (per timing diagram) | | |
| A | "0" OUTPUT | "0" OUTPUT |
| B | "1" OUTPUT | "0" OUTPUT |

Any conditions other than those shown are the result of a fault.

The comparator outputs are low level signals. These are amplified and returned to the data memory control DMC circuits in FIG. 4 in a fashion similar to the sense amplifier outputs. Differential line receivers LRF1 and LRF2 convert these outputs to logic levels, and it is these logic levels that are sampled. The results of the sampling are stored in a set of flip-flops 401, 402 and 403. The sampling circuits can set a flip-flop to indicate an error; the flip-flops can only be reset by stored program control. This allows the fault detectors to be examined by the stored program on aa periodic basis, thus avoiding the requirement for an interrupt capability in the system. Three flip-flops are used for each DMS unit, for a total of 9 flip-flops, which are addressable by the stored program as the Fault Flag Register. The address chosen is 1FF11, derived as follows. The page address of the memory is 1, driver address FF is an unequipped driver, and 11 is a normal switch address. A valid switch address must be used, otherwise a fault indicator will appear (no switch operated).

Any unequipped DMS unit will appear faulty (no switch operated), thus when the stored program checks the FFR, any bits pertaining to unequipped DMS units must be masked.

6. Protective Software

Memory drivers which are open or shorted to ground are difficult to detect with hardware. Such detection can be done with software by requiring that each driver be connected to at least one non-zero memory word. For diagnostic convenience these words should all have the same switch address.

A short between two drivers can be detected in the following manner:

*a*. Equip a non-zero memory word in each driver.

*b*. Give both words the same switch address.

*c*. Give the words different contents.

*d*. If a short occurs between the two drivers, one of the words will read incorrectly. It is not possible to predict which one.

7. Core Output Multiple (See FIG. 7)

In the S1 MEMORY patent all core outputs are run individually, via twisted pair, from the core module to a dedicated input on the Read Amplifier. In this manner the bit 1 core outputs for ten modules will come to ten inputs on the Read Amplifier where they are effectively OR'd.

For SYSTEM S2 herein, the core outputs are effectively OR'd as they leave the module by a diode CR1A. This offers the following advantages.

*a*. The wiring from the modules is greatly simplified and the number of inputs to the Sense Amplifier card is reduced to 2 per bit, thus permitting all 20 sense amplifiers to be put on the same card.

*b*. The diode effectively decouples the core output multiple, permitting the core to be cleared down quickly by the resistor across each core sense winding. The cable from the diode to the sense amplifier is cleared down by the terminating resistance of the sense amplifier input.

*c*. It is now feasible to make the sense amplifier input differential so that the core output bus is balanced with respect to ground, offering improved noise immunity.

Figure 8:
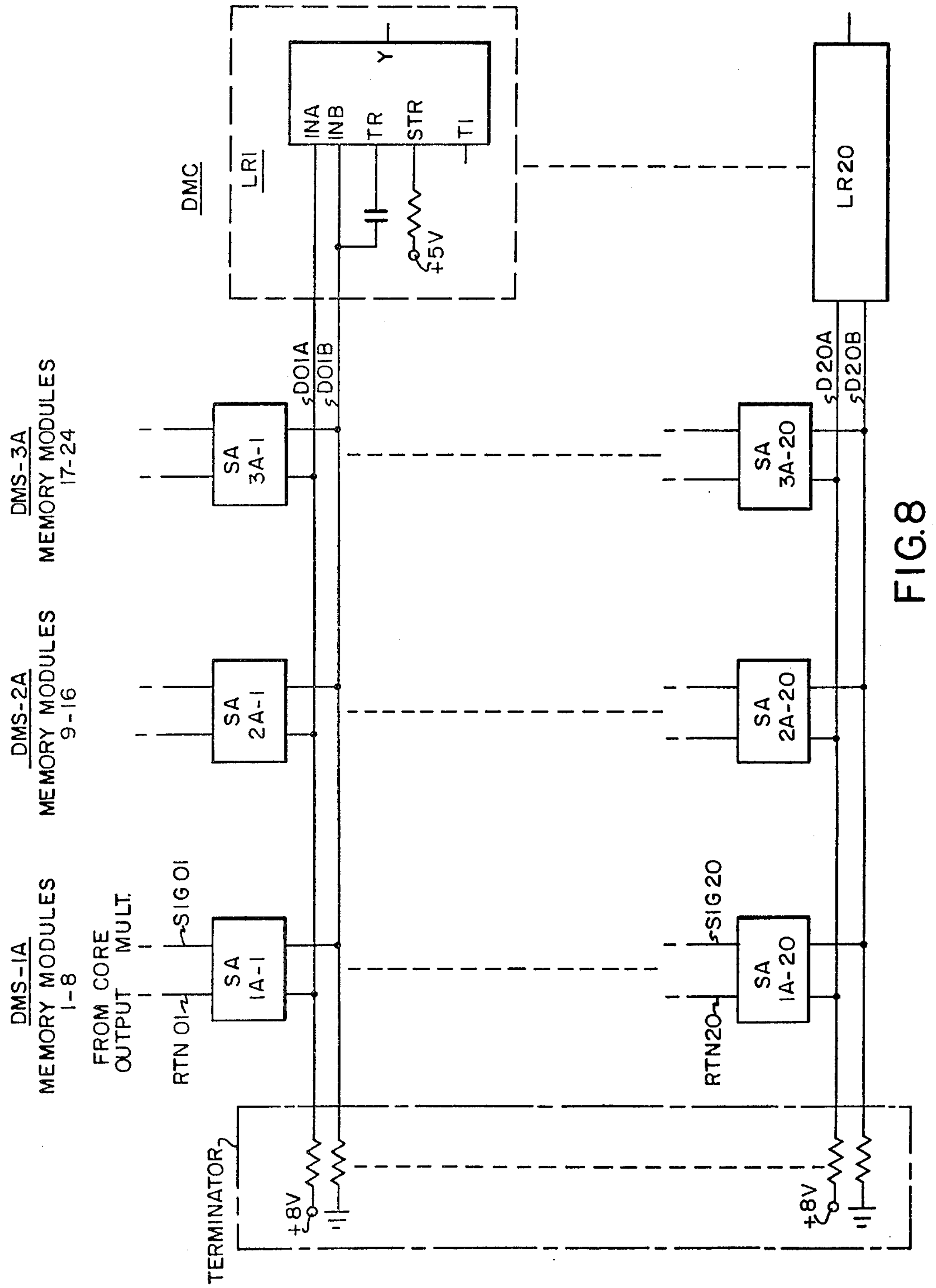
FIG. 8 shows how the outputs of the sense amplifiers are coupled to line receivers.

8. Sense Amplifier (See FIGS. 8 and 9)

The present S1 MEMORY patent read amplifier is a single sided amplifier of fixed gain, with five summing inputs - one for each core. The output is also single sided with active pull up and passive pull down. This configuration is noise prone since five inputs are summed and each has up to 15 feet of wire on it. One wire of each pair from the core output is *a–c* coupled to ground and is thus not balanced.

The SYSTEM S2 sense amplifier herein has differential inputs and outputs. Only one twisted pair comes into the bit 1 input since the OR'ing was done on the back of the module via the diodes. In addition this single twisted pair is now balanced with respect to ground and has a common mode noise immunity of approx. 4 volts.

9. Previously if the signal wire from the core was shorted to ground both outputs would be reduced, thereby affecting both systems. However, in the SYSTEM S2 herein, a short on one core output will not affect the other system since they are both floating.

There is an *a–c* connection provided in the sense amplifier such that permanent potentials on the core output multiple will not cause a permanent output from the sense amplifier.

The output of the sense amplifier is a party line differential driver. The output feeds onto a bus terminated at one end by fixed resistors which supply the potentials to this bus, and at the other end by an *a–c* termination consisting of a resistor and capacitor in series connected to an integrated circuit line receiver. The bus is normally held in one state by the terminator card and is reversed by an output from the sense amplifier.

The line receiver responds only to potential reversals on its input and not to common mode swings below ±15 volts.

The sense amplifier outputs tend to follow the input, above a certain threshold, in a linear manner in order to reduce di/dt and hence large voltage transients.

The outputs are also protected against momentary shorts to ground or the supply.

Line Receivers:

To conserve power an a-c termination is used at the end of the Sense Amplifier bus located in the data memory control DMC. This provides the necessary termination for the signal and transients, but draws no current when the Sense Amplifiers are off. The actual line receiver is a NATIONAL TYPE DM8820 which responds to polarity reversal at its inputs while maintaining a common mode rejection of ±15 volts. The outputs are strobed into latches under control of the DMC.

What is claimed is:

1. Fault detection means for a memory arrangement having memory units comprising a plurality of ring-shaped magnetic cores with an individual sense winding on each core, word wires selectively threaded through the inside of some of said cores and outside of others to thereby store information; memory input means comprising a plurality of memory drivers each having an output connected to a driver terminal, a plurality of memory switches each having an output connected to a switch terminal, each of said word wires connected in series with diode means between a driver terminal and a switch terminal, selection means coupling a memory address register to the drivers and switches to select one driver and one switch to thereby select one word wire corresponding to an address in the address register, and actuation means to energize the selected driver and selected switch to pass a current ramp pulse through the selected word wire, to thereby generate an output pulse in the sense winding of each core having the selected wire threaded through it, wherein said actuation means includes sequence timing means to provide a memory cycle, wherein said switches each comprises a transistor with a collector electrode connected via a bias resistor to a bias junction point common to all switches of a memory unit;

wherein said fault detection means comprises a common resistor connected between said bias junction point and a bias voltage source; a first detector comprising means to compare the voltage drop across said common resistor to a first reference such that an output is produced if at least one of said switches is turned on; a second detector comprising means to compare said voltage drop to a second reference such that an output is produced if more than one of said switches is turned on; a fault register comprising a first, a second and a third bistable device; means coupling the outputs of the first and second detectors respectively to the second and third bistable devices, and coupling the first detector via inverting means to the first bistable device;

strobe means coupling the sequence timing means to said bistable devices to store the inverted output condition of the first detector in the first bistable device during the memory cycle before energizing the selected switch, and to store the output conditions of the first and second detectors respectively in the second and third bistable devices during the memory cycle at the end of the time during which the selected switch is energized.

2. Fault detection means as claimed in claim 1, wherein said memory arrangement includes an output register comprising a set of bistable devices which are coupled to said sense windings and selectively set by said output pulses, bus means coupling the memory arrangement to a central processor with means to receive address information and control signals from the central processor to store the address information in said memory address register, said control signals including either a data in or a data out signal, means responsive to a data in signal and a normal memory address to gate data from said output register to the bus means for transmission to the central processor;

wherein said fault detection means includes means responsive to a special address in the memory address register to inhibit said means to gate data from said output register, means responsive to the special address and the data in signal to gate data from said fault register to the bus means for transmission to the central processor, and means responsive to the special address and the data out signal to clear the fault register.

3. Fault detection means as claimed in claim 2, wherein the addresses comprise driver select digits and switch select digits, and said special address comprises given driver select digits and any switch select digits, there being no memory driver actually selected by said given driver select digits.

4. Fault detection means as claimed in claim 3, wherein said memory arrangement comprises M memory units each having individual thereto at least a plurality of said magnetic cores with memory drivers and memory switches, and each unit having individual thereto said first and second detectors, said common resistor, and said first, second, and third bistable devices of the fault register, so that there are a total of 3M fault register bistable devices, each having its output connected to a conductor of the bus means for a different bit position, with said special address being effective with the data in signal to enable the means to gate the fault data from all of the 3M bistable devices at one time, or with the data out signal to clear all of the 3M bistable devices.

5. Fault detection means as claimed in claim 1, further including a special word wire for each memory driver, each connected between its memory driver and the same memory switch, the special word wires being threaded for different contents for any two memory drivers, so that if a short occurs between two memory drivers, accessing the memory arrangement with the address for one of the special word wires will produce an incorrect output.

6. Fault detection means for a memory arrangement coupled to a central processor via bus means;

said memory arrangement comprising a plurality of word stores, an address register coupled to the bus means to receive address information, means receiving control signals from the bus means, memory input means coupled between the address register and the word stores to select during a memory cycle one word store corresponding to the address information in the address register, and output means including an output register to receive data from a selected word store, said control signals including either a data in or a data out signal, means responsive to a data in signal and a normal memory address to gate data from said output register to the bus means for transmission to the central processor;

said fault detection means comprising a fault register, fault detectors with means to detect given hardware faults in the memory arrangement during each memory cycle, means coupling the fault detectors to the fault register to store information relating to any faults detected, there being a special address for which no word store is provided, means responsive to said special address in the memory address register to inhibit said meams tp gate data from said output register, means responsive to the special address and the data in signal to gate data from said fault register to the bus means for transmission to the central processor, and means responsive to the special address and the data out signal to clear the fault register.

7. Fault detection means for a memory arrangement having memory units comprising a plurality of ring-shaped magnetic cores with an individual sense winding on each core, word wires selectively threaded through the inside of some of said cores and outside of others to thereby store information; memory input means comprising a plurality of memory drivers each having an output connected to a driver terminal, a plurality of memory switches each having an output connected to a switch terminal, each of said word wires connected in series with diode means between a driver terminal and a switch terminal, selection means coupling a memory address register to the drivers and switches to select one driver and one switch to thereby select one word wire corresponding to an address in the address register, and actuation means to energize the selected driver and selected switch to pass a current ramp pulse through the selected word wire, to thereby generate an output pulse in the sense winding of each core having the selected wire threaded through it;

wherein said fault detection means includes a special word wire for each memory driver, each connected between its memory driver and the same memory switch, the special word wires being threaded for different contents for any two memory drivers, so that if a short occurs between two memory drivers, accessing the memory arrangement with the address for one of the special word wires will produce an incorrect output.

* * * * *